United States Patent
Li et al.

(10) Patent No.: US 8,241,545 B2
(45) Date of Patent: Aug. 14, 2012

(54) METHOD OF MAKING POLYLACTIC ACID AND ITS PRODUCTS

(75) Inventors: Zhenjiang Li, Nanjing (CN); Pingkai Ouyang, Nanjing (CN); He Huang, Nanjing (CN)

(73) Assignee: Nanjing Universty of Technology, Nanjing, Jiangsu Province (CN)

( * ) Notice: Subject to any disclaimer, the term of this patent is extended or adjusted under 35 U.S.C. 154(b) by 0 days.

(21) Appl. No.: 13/034,030

(22) Filed: Feb. 24, 2011

(65) Prior Publication Data

US 2011/0140307 A1 Jun. 16, 2011

Related U.S. Application Data

(63) Continuation-in-part of application No. PCT/CN2009/073674, filed on Sep. 1, 2009.

(51) Int. Cl.
 B29C 47/78 (2006.01)
 D01F 1/02 (2006.01)
 C08G 69/14 (2006.01)
 C08G 63/08 (2006.01)

(52) U.S. Cl. .......... 264/211.24; 264/209.6; 264/211; 528/27; 528/313; 528/316; 528/317; 528/323; 528/327; 528/354; 528/359; 528/370; 528/405

(58) Field of Classification Search .................. None
See application file for complete search history.

(56) References Cited

U.S. PATENT DOCUMENTS

| | | | |
|---|---|---|---|
| 3,736,646 A | 6/1973 | Schmitt et al. | |
| 4,045,418 A | 8/1977 | Sinclair | |
| 4,057,537 A | 11/1977 | Sinclair | |
| 5,235,031 A | 8/1993 | Drysdale et al. | |
| 5,310,599 A * | 5/1994 | Ford | 528/354 |
| 5,357,034 A | 10/1994 | Fridman et al. | |
| 5,378,801 A * | 1/1995 | Reichert et al. | 528/354 |
| 5,484,882 A * | 1/1996 | Takada et al. | 528/361 |
| 5,574,129 A * | 11/1996 | Miyoshi et al. | 528/354 |
| 5,696,219 A | 12/1997 | Jallouli et al. | |
| 5,844,066 A * | 12/1998 | Kakizawa | 528/354 |
| 5,886,093 A * | 3/1999 | Davies et al. | 524/755 |
| 6,166,169 A * | 12/2000 | Fritz et al. | 528/272 |
| 6,214,967 B1 * | 4/2001 | Jansson et al. | 528/354 |
| 6,569,989 B2 | 5/2003 | Ohara et al. | |
| 6,657,042 B2 * | 12/2003 | Rafler et al. | 528/357 |
| 6,875,839 B2 | 4/2005 | Gerking et al. | |
| 7,488,783 B2 * | 2/2009 | Coszach et al. | 525/450 |
| 7,772,350 B2 | 8/2010 | Blanc-Magnard et al. | |
| 2006/0014975 A1 * | 1/2006 | Coszach et al. | 560/179 |
| 2006/0100365 A1 | 5/2006 | Tam et al. | |
| 2007/0252311 A1 | 11/2007 | Tam et al. | |
| 2008/0146822 A1 * | 6/2008 | De Vos | 549/274 |
| 2009/0281068 A1 * | 11/2009 | Moller et al. | 514/152 |
| 2010/0234557 A1 * | 9/2010 | Sato et al. | 528/354 |
| 2010/0317797 A1 * | 12/2010 | Rafler et al. | 524/786 |

FOREIGN PATENT DOCUMENTS

| | | |
|---|---|---|
| CN | 1325913 | 12/2001 |
| CN | 1544504 | 11/2004 |
| CN | 1814644 | 8/2006 |
| CN | 1814645 | 8/2006 |
| JP | 7304859 A | 11/1995 |
| JP | 2850101 B2 | 1/1999 |
| JP | 2002300898 | 10/2002 |

OTHER PUBLICATIONS

Conner et al., "First Example of N-Heterocyclic Carbenes as Catalysts for Living Polymerization: Organocatalytic Ring-Opening Polymerization of Cyclic Esters," Journal of the American Chemical Society, 2002, 124, 914-915.

Duong et al., "Reversible carboxylation of N-heterocyclic carbenes," Chemical Communications, 2004, 112-113.

Tudose et al., "Imidazol(in)ium-2-carboxylates as N-heterocyclic carbene precursors in ruthenium—arene catalysts for olefin metathesis and cyclopropanation," Journal of Organometallic Chemistry, 2006, 691, 5356-5365.

Jacobsen et al., "Single-step reactive extrusion of PLLA in a corotating twin-screw extruder promoted by 2-ethylhexanoic acid tin(II) salt and triphenylphosphine," Polymer, 2000, 41(9), 3395-3403.

Nederberg et al., "New Paradigms for Organic Catalysts: The First Organocatalytic Living Polymerization," Angewandte Chemie International Edition, 2001, 40, 2712-2715.

Nyce et al., "In Situ Generation of Carbenes: A General and Versatile Platform for Organocatalytic Living Polymerization," Journal of the American Chemical Society, 2003, 125, 3046-3056.

Nyce et al., "A General and Versatile Approach to Thermally Generated N-Heterocyclic Carbenes," Chemistry-A European Journal, 2004, 10, 4073-4079.

Csihony et al., "Single-Component Catalyst/Initiators for the Organocatalytic Ring-Opening Polymerization of Lactide," Journal of the American Chemical Society, 2005, 127, 9079-9084.

(Continued)

*Primary Examiner* — Jeffrey Wollschlager
(74) *Attorney, Agent, or Firm* — Allen (Zhi Yang) Xue

(57) ABSTRACT

The present disclosure provides a method for preparing polylactic acid and its products using a twin-screw extruder, comprising the step of mixing carbon dioxide adducts of carbene and lactide, and obtaining polylactic acid and its products via reactive extrusion using a twin-screw extruder. Some of the carbon dioxide adducts or carbene have the following general formula:

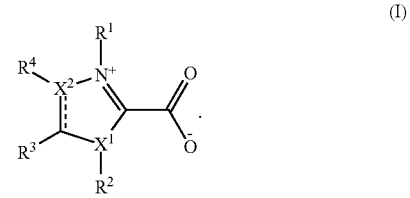

(I)

20 Claims, 1 Drawing Sheet

OTHER PUBLICATIONS

Holbrey et al., "1,3-Dimethylimidazolium-2-carboxylate: the unexpected synthesis of an ionic liquid precursor and carbene-CO2 adduct," Chemical Communications, 2003, 28-29.

Voutchkova et al., "Disubstituted Imidazolium-2-Carboxylates as Efficient Precursors to N-Heterocyclic Carbene Complexes of Rh, Ru, Ir, and Pd," Journal of the American Chemical Society, 2005, 127, 17624-17625.

Tudose et al., "Imidazol(in)ium carboxylates as N-heterocyclic carbene ligand precursors for Suzuki-Miyaura reactions," Tetrahedron Letters, 2006, 47, 8529-8533.

Tudose et al., Journal of Organometallic Chemistry, 2006, 691, 5356-5365.

Kato et al., "Enzymatic Synthesis of Polythioester by the Ring-Opening Polymerization of Cyclic Thioester," Biomacromolecules, 2007, 8, 3590-3596.

Coulembier et al., "From controlled ring-opening polymerization to biodegradable aliphatic polyester: Especially poly(b-malic acid) derivatives," Progress in Polymer Science, 2006, 31, 723-747.

Dove et al., "N-Heterocyclic carbenes: Effective organic catalysts for living polymerization," Polymer, 2006, 47, 4018-4025.

Culkin et al., "Zwitterionic Polymerization of Lactide to Cyclic Poly(Lactide) by Using N-Heterocyclic Carbene Organocatalysts," Angewandte Chemie International Edition, 2007, 46, 2627-2630.

Csihony et al., "Bredereck's Reagent Revisited: Latent Anionic Ring-Opening Polymerization and Transesterification Reactions," Advanced Synthesis and Catalysis, 2004, 346, 1081-1086.

Coulembier et al., "Latent, Thermally Activated Organic Catalysts for the On-Demand Living Polymerization of Lactide," Angewandte Chemie International Edition, 2005, 44, 4964-4968.

\* cited by examiner

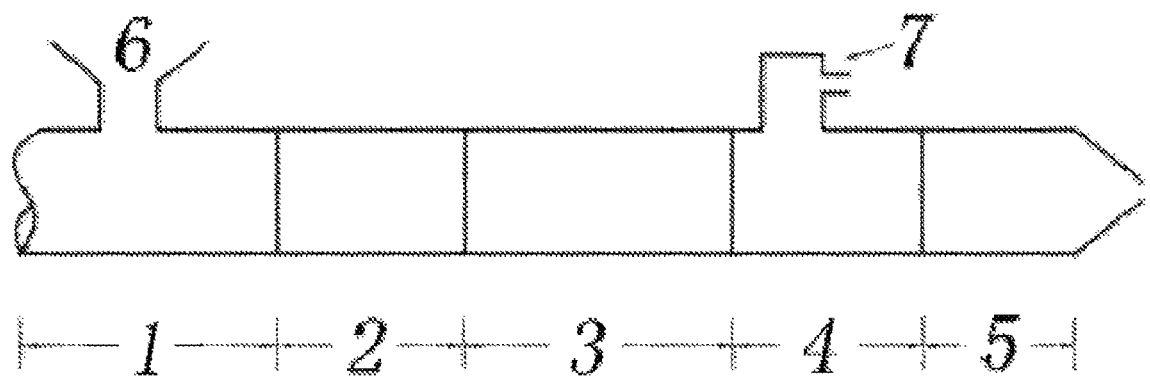

METHOD OF MAKING POLYLACTIC ACID AND ITS PRODUCTS

CROSS-REFERENCES TO RELATED APPLICATIONS

This application is a continuation-in-part of International Application No. PCT/CN2009/073674, filed Sep. 1, 2009, which claims the benefit of Chinese Patent Application No. 200810146618.3, filed Sep. 1, 2008.

TECHNICAL FIELD

This disclosure is in the technical field of polymeric material, specifically involving the use of twin-screw extruders in preparation of polylactic acid in a controlled manner.

BACKGROUND

Polylactic acid is a polymeric material that has good biocompatibility and degradability. It has great prospects for applications in areas such as pharmaceuticals, textile, and packaging. New methods for manufacturing polylactic acid are needed.

BRIEF SUMMARY OF THE DISCLOSURE

This disclosure provides a method of preparing polylactic acid and its products using a twin-screw extruder. The polylactic acid obtained using this method does not contain metal residue, its molecular weight and terminal structure are controllable, and its molecular weight distribution is narrow.

Since N-heterocyclic carbenes are very sensitive to water and oxygen, its preparation, transfer, and catalytic reaction needs to be carried out in a water-free, anaerobic environment. Such a requirement makes the N-heterocyclic carbene transfer, i.e., adding N-heterocyclic carbenes into reactive extrusion system, infeasible. To this end, the present disclosure employs adducts of carbenes, which are stable in the presence of water and oxygen but can release $CO_2$ to form N-heterocyclic carbenes at a certain temperature (the decarboxylation temperature). The decarboxylation temperature of carbon dioxide from the $CO_2$ adducts of carbenes is determined by substituents on the ring. The present disclosure involves finding the $CO_2$ adducts of carbenes that has a suitable decarboxylation temperature by adjusting substituents on the carbene ring. The $CO_2$ adducts of carbenes are used in lactide ring-opening polymerization by reactive extrusion. That is, the selected $CO_2$ adducts of carbine should have a decarboxylation temperature that is suitable both for the ring-opening polymerization of lactide and for the reactive extrusion process. The disclosure uses $CO_2$ adducts of carbenes as a catalyst precursor of small organic molecules, which has high catalytic activity in lactide ring-opening polymerization, and at the same time solves problems of metal residue in the polylactic acid.

In order to effectively apply the reactive extrusion technology in this reaction, the present disclosure also takes into consideration the requirement for the reaction time imposed by the reactive extrusion technology. Based on information obtained by screening of various substituents of N-heterocyclic carbenes, the present disclosure discloses a category of $CO_2$ adducts of carbenes as the catalyst precursor, which accelerates the reaction rate. In addition, the reactive extrusion process can further select the appropriate temperature, aspect ratio of the screw, and screw rotation speed in order to obtain a better dispersion in the reaction system, which in turn increases the reaction rate thus shortens the reaction time.

The terminal structure and molecular weight of polylactic acid can be controlled. For example, using active hydrogen containing compounds (ROH) as the initiator in the ring-opening polymerization reaction results in polylactic acid with terminal structure of RO— and —OH. While the ratio of the lactide and initiator determines the target molecular weight of polylactic acid. In the presence of the initiator, N-heterocyclic carbene catalyzed ring-opening polymerization of lactide is living polymerization, while reactive extrusion system also has a good dispersion. The polylactic acid so obtained may have a relatively narrow molecular weight distribution.

Therefore, by employing $CO_2$ adducts of carbenes of the present disclosure as the catalyst precursor to be mixed with lactide, using the reactive extraction technology, which releases the N-heterocyclic carbenes during the reactive extrusion process, this catalytic ring-opening polymerization of lactide can further synthesize polylactic acid and its products having controllable molecular weight and terminal structures, without metal residues, and having a narrow molecular weight distribution.

This disclosure provides a method of making polylactic acid and its products using a twin-screw extruder, which comprises mixing the $CO_2$ adducts of carbenes of formula (I) with the lactide, extrude the mixture using reactive extrusion in a twin-screw extruder to obtain polylactic acid and its products,

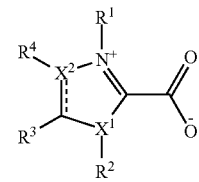

wherein the dotted line together with the solid line parallel to it represents a single bond or a double bond; $X^1$ is chosen from S and N; $X^2$ is chosen from C and N; $R^1$ and $R^2$ can be the same or different and are chosen from
hydrogen,
alkyl groups having 1 to 10 carbon atoms,
alkyl groups having 1 to 10 carbon atoms and also having one or more substituents chosen from halogens, a hydroxyl group, a phenyl group, and a cyano group,
cycloalkyl groups having 3 to 6 carbon atoms,
a halogen atom,
an adamantane group,
a phenyl group, and
a phenyl group having one or more substituents chosen from halogens, a hydroxyl group, an alkyl group, and a cyano group;
$R^3$ and $R^4$ can be the same or different and are chosen from
hydrogen,
a halogen atom,
a cyano group,
a hydroxyl group,
alkyl groups having 1 to 4 carbon atoms,
alkyl groups having 1 to 4 carbon atoms and also having one or more substituents chosen from halogens, a hydroxyl group, a phenyl group, and a cyano group,
a phenyl group, and a phenyl group having one or more substituents chosen from halogens, a hydroxyl group, an alkyl group, and a cyano group.

Alternatively, $R^3$ and $R^4$ are connected to form cycloalkyl or cycloalkenyl rings having 3 to 8 carbon atoms fused to the five-membered ring that contains $X_1$, $X_2$, and the nitrogen atom (in which case $X_2$ and the carbon atom in the 5-membered ring next to $X_2$ are also part of said cycloalkyl or cycloalkenyl rings); or $R^3$ and $R^4$ are connected to form a benzene ring fused to the five-membered ring that contains $X_1$, $X_2$, and the nitrogen atom (in which case $X_2$ and the carbon atom in the 5-membered ring next to $X_2$ are also part of said benzene ring); or $R^2$ and $R^3$ are connected to form 5-membered or 6-membered N-heterocyclic rings having no substituent, which are fused to the five-membered ring that contains $X_1$, $X_2$, and the nitrogen atom (in which case $X_1$ and the carbon atom in the 5-membered ring connected to $R^3$ are also part of said 5-membered or 6-membered N-heterocyclic rings).

One specific structure of the above-described $CO_2$ adducts of carbenes can be represented as in formula (II):

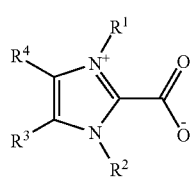

(II)

$R^1$ and $R^2$ can be the same or different and are chosen from
hydrogen,
alkyl groups having 1 to 10 carbon atoms,
alkyl groups having 1 to 10 carbon atoms and also having one or more substituents chosen from halogens, a hydroxyl group, a phenyl group, and a cyano group,
cycloalkyl groups having 3 to 6 carbon atoms,
a halogen atom,
an adamantane group,
a phenyl group, and
a phenyl group having one or more substituents chosen from halogens, a hydroxyl group, an alkyl group, and a cyano group;

$R^3$ and $R^4$ can be the same or different and are chosen from
hydrogen,
a halogen atom,
a cyano group,
a hydroxyl group,
alkyl groups having 1 to 4 carbon atoms,
alkyl groups having 1 to 4 carbon atoms and also having one or more substituents chosen from halogens, a hydroxyl group, a phenyl group, and a cyano group,
a phenyl group, and
a phenyl group having one or more substituents chosen from halogens, a hydroxyl group, an alkyl group, and a cyano group.

Alternatively, $R^3$ and $R^4$ are connected to form cycloalkyl or cycloalkenyl rings having 3 to 8 carbon atoms fused to the five-membered ring that contains $X_1$, $X_2$, and the nitrogen atom (in which case $X_2$ and the carbon atom in the 5-membered ring next to $X_2$ are also part of said cycloalkyl or cycloalkenyl rings), or $R^3$ and $R^4$ are connected to form a benzene ring fused to the five-membered ring that contains $X_1$, $X_2$, and the nitrogen atom (in which case $X_2$ and the carbon atom in the 5-membered ring next to $X_2$ are also part of said benzene ring).

One specific structure of the above-described $CO_2$ adducts of carbenes can be presented as in formula (III):

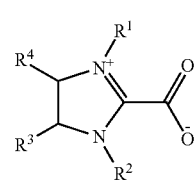

(III)

$R^1$ and $R^2$ can be the same or different and are chosen from
hydrogen,
alkyl groups having 1 to 10 carbon atoms,
alkyl groups having 1 to 10 carbon atoms and also having one or more substituents chosen from halogens, a hydroxyl group, a phenyl group, and a cyano group,
cycloalkyl groups having 3 to 6 carbon atoms,
a halogen atom,
an adamantane group,
a phenyl group, and
a phenyl group having one or more substituents chosen from halogens, a hydroxyl group, an alkyl group, and a cyano group;

$R^3$ and $R^4$ can be the same or different and are chosen from
hydrogen,
a halogen atom,
a cyano group,
a hydroxyl group,
alkyl groups having 1 to 4 carbon atoms,
alkyl groups having 1 to 4 carbon atoms and also having one or more substituents chosen from halogens, a hydroxyl group, a phenyl group, and a cyano group,
a phenyl group, and
a phenyl group having one or more substituents chosen from halogens, a hydroxyl group, an alkyl group, and a cyano group.

Alternatively, $R^3$ and $R^4$ are connected to form cycloalkyl or cycloalkenyl rings having 3 to 8 carbon atoms fused to the five-membered ring that contains $X_1$, $X_2$, and the nitrogen atom (in which case $X_2$ and the carbon atom in the 5-membered ring next to $X_2$ are also part of said cycloalkyl or cycloalkenyl rings).

One specific structure of the above-described $CO_2$ adducts of carbenes can be represented as in formula (IV):

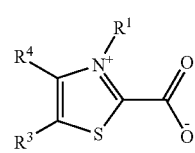

(IV)

$R^1$ is chosen from
hydrogen,
alkyl groups having 1 to 10 carbon atoms,
alkyl groups having 1 to 10 carbon atoms and also having one or more substituents chosen from halogens, a hydroxyl group, a phenyl group, and a cyano group,
cycloalkyl groups having 3 to 6 carbon atoms, a halogen atom,
an adamantane group,
a phenyl group, and
a phenyl group having one or more substituents chosen from halogens, a hydroxyl group, an alkyl group, and a cyano group;

$R^3$ and $R^4$ can be the same or different and are chosen from
hydrogen,
a halogen atom,
a cyano group,
a hydroxyl group,
alkyl groups having 1 to 4 carbon atoms,
alkyl groups having 1 to 4 carbon atoms and also having one or more substituents chosen from halogens, a hydroxyl group, a phenyl group, and a cyano group,
a phenyl group, and
a phenyl group having one or more substituents chosen from halogens, a hydroxyl group, an alkyl group, and a cyano group.

Alternatively, $R^3$ and $R^4$ are connected to form cycloalkyl or cycloalkenyl rings having 3 to 8 carbon atoms fused to the five-membered ring that contains $X_1$, $X_2$, and the nitrogen atom (in which case $X_2$ and the carbon atom in the 5-membered ring next to $X_2$ are also part of said cycloalkyl or cycloalkenyl rings), or $R^3$ and $R^4$ are connected to form a benzene ring fused to the five-membered ring that contains $X_1$, $X_2$, and the nitrogen atom (in which case $X_2$ and the carbon atom in the 5-membered ring next to $X_2$ are also part of said benzene ring).

specific structure of the above-described $CO_2$ adducts of carbenes can be presented as in formula (V):

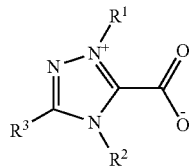

(V)

$R^1$ and $R^2$ can be the same or different and are chosen from
hydrogen,
alkyl groups having 1 to 10 carbon atoms,
alkyl groups having 1 to 10 carbon atoms and also having one or more substituents chosen from halogens, a hydroxyl group, a phenyl group, and a cyano group,
cycloalkyl groups having 3 to 6 carbon atoms,
a halogen atom,
an adamantane group,
a phenyl group, and
a phenyl group having one or more substituents chosen from halogens, a hydroxyl group, an alkyl group, and a cyano group;

$R^3$ is chosen from
hydrogen,
a halogen atom,
a cyano group,
a hydroxyl group,
alkyl groups having 1 to 4 carbon atoms,
alkyl groups having 1 to 4 carbon atoms and also having one or more substituents chosen from halogens, a hydroxyl group, a phenyl group, and a cyano group,
a phenyl group, and
a phenyl group having one or more substituents chosen from halogens, a hydroxyl group, an alkyl group, and a cyano group.

Alternatively, $R^2$ and $R^3$ are connected to form 5-membered or 6-membered N-heterocyclic rings having no substituent, which are fused to the five-membered ring that contains $X_1$, $X_2$, and the nitrogen atom (in which case $X_1$ and the carbon atom in the 5-membered ring connected to $R^3$ are also part of said 5-membered or 6-membered N-heterocyclic rings).

In the above-described method, the $CO_2$ adducts of carbenes and lactide can be of a molar ratio ranging from 1:5 2000, preferably 1:100 1000. The lactide can be L-lactide, D-lactide, meso-lactide, racemic-lactide, or a mixture of L-lactide, D-lactide, and meso-lactide at any proportion.

The above-described method can use compounds having hydroxyl groups as the initiator, preferably alcohols, for example, benzyl alcohol or phenylethyl alcohol. The molar ratio of the initiator and lactide can range from 1:100001:2, preferably 1:1000 1:100.

A specific the twin-screw extruder in the above-described method is an intermeshing co-rotating twin-screw extruder. The barrel of the extruder comprises multiple independently heated sections. The temperatures of individual sections are independently controllable using circulating cooling water. Each heating section can be at a same or different temperatures ranging from 50° C. 300° C., preferably from 100° C. 200° C. The gas pressure inside the barrel can range from 0.5 kPa 1 kPa absolute pressure. The ratio of length and diameter of the screw (the aspect ratio) can range from 30 to 70. The rotation speed of the screw can range from 5 rpm 200 rpm; the material feed rate can range from 0.5 kg/hour 5 kg/hour. The head of the twin-screw extruder can be connected with a molding equipment so that the extruded polylactic acid and its products can be directly molded.

As in the method of controlled preparation of polylactic acid using twin-screw extruder, in the process of reactive extrusion, the $CO_2$ adducts of carbenes releases $CO_2$ and form N-heterocyclic carbenes, which catalyze lactide ring-opening polymerization. The $CO_2$ released is vented. The residual catalyst is a biodegradable organic material and is in a small amount, which will not affect the property of the polylactic acid. In addition, the entire polymerization process is a living polymerization, which affords the control of the molecular weight of the polylactic acid, a narrow molecular weight distribution, and the precise control of the terminal group on the polylactic acid. The method of this disclosure provides a single step reaction process, which is quick, simple, cost-effective, and can be used for large-scale production.

BRIEF DESCRIPTION OF THE DRAWINGS

Examples of this disclosure are described in details with reference to the drawings in the following.

FIG. 1 is a schematic of a barrel of twin-screw extruder showing various sections. Among them, numeral 1 refers to the section into which raw material is fed; numeral 2 indicates Section I; numeral 3 indicates Section II, numeral 4 indicates Section III; numeral 5 indicates Section IV; numeral 6 is the hopper for the raw material; and numeral 7 is a vacuum valve.

DETAILED DESCRIPTION

The following examples are used to further illustrate the present disclosure. These examples are for the purpose of illustration and in no way limit the disclosure. One of ordinary skill in the art would appreciate that these examples do not limit the present disclosure in any aspects, and that appropriate modification and adjustment of the parameters can be made without violating the essence of this disclosure and deviation from the scope of the present disclosure.

In all of the following examples, the twin-screw extruder is first purged with argon gas, then lactide, the initiator (optional), the $CO_2$ adducts of carbenes are uniformly mixed, and fed into the extruder at a constant rate. The structure and number of the $CO_2$ adducts of carbenes in the following examples are listed in Table 1.

TABLE 1

$CO_2$ adducts of carbenes used in the examples

| No. | Structure |
| --- | --- |
| a | [structure: 1-methyl-3-ethyl imidazolium-2-carboxylate] |
| b | [structure: 1,3-bis(2,6-diisopropylphenyl)imidazolium-2-carboxylate] |
| c | [structure: 1-methyl-3-benzyl imidazolium-2-carboxylate] |
| d | [structure: 1,3-dibutyl imidazolinium-2-carboxylate] |
| e | [structure: 1,3-diethyl-4,5-dichloro imidazolinium-2-carboxylate] |

TABLE 1-continued $CO_2$ adducts of carbenes used in the examples

| No. | Structure |
| --- | --- |
| f | [structure: 1,3-bis(4-methylphenyl)-4,5-diethyl imidazolium-2-carboxylate] |
| g | [structure: 1,3-bis(4-bromophenyl)-4-ethyl-5-methyl imidazolium-2-carboxylate] |
| h | [structure: 1,3-bis(4-methylphenyl) benzimidazolium-2-carboxylate] |
| i | [structure: 1-methyl-3-butyl benzimidazolium-2-carboxylate] |

TABLE 1-continued

CO$_2$ adducts of carbenes used in the examples

| No. | Structure |
|---|---|
| j | (structure) |
| k | (structure) |
| l | (structure) |
| m | (structure) |
| n | (structure) |
| o | (structure) |
| p | (structure) |
| q | (structure) |
| r | (structure) |
| s | (structure) |

FIG. 1 is a schematic of the sections in the barrel of the twin-screw extruder. The twin-screw extruder in all of the following examples have a barrel with four sections, each individual section has independent temperature control using circulating cooling water. The method of operating the twin-screw extruder is known in the field. One of ordinary skill in the art may complete the operation in accordance with the following operating parameters.

The molecular weight and molecular weight distribution of the polylactic acid are obtained by gel permeation chromatography (chloroform as the mobile phase, 35° C., polystyrene standard as the reference). The pressure in all the following examples is absolute pressure.

Example 1

The parameters of the twin-screw extruder were set as follows: screw speed: 80 rpm, vacuum: 0.5 kPa, aspect ratio: 48, feed rate: 1.75 kg/h.

The temperatures of various barrel sections were set as follows: Section I: 140° C., Section II: 185° C., Section III: 200° C., Section IV: 185° C.

L-lactide (672 g, 4.67 mol) and the $CO_2$ adduct of carbene a (0.36 g, 0.002 mol) were evenly mixed, fed into the twin-screw extruder at a constant rate. Six hundred twenty eight grams (628 g) of polylactic acid was extruded using the above described operating parameters and cooled by air cooling. The polylactic acid thus obtained had a molecular weight of 25,000 and a molecular weight distribution of 2.1.

Example 2 parameters of the twin-screw extruder were set as follows: screw speed: 50 rpm, vacuum: 0.5 kPa, aspect ratio: 48, material feed rate: 0.5 kg/h.

The temperatures of various barrel sections were set as follows: Section I: 120° C., Section II: 175° C., Section III: 180° C., Section IV: 175° C.

D-lactide (2016 g, 14 mol) and the $CO_2$ adduct of carbene b (1210.38 g, 2.8 mol) were evenly mixed and fed into the twin-screw extruder at a constant rate. One thousand eight hundred and eight two grams (1882 g) of polylactic acid was extruded using the above described operating parameters and cooled by air cooling. The polylactic acid thus obtained had a molecular weight of 6,000 and a molecular weight distribution of 2.2.

Example 3

The parameters of the twin-screw extruder were set as follows: screw speed: 80 rpm, vacuum: 0.5 kPa, aspect ratio: 48, material feed rate: 1.25 kg/h.

The temperatures of various barrel sections were set as follows: Section I: 120° C., Section II: 175° C., Section III: 180° C., Section IV: 175° C.

Meso-lactide (2016 g, 14 mol), the $CO_2$ adduct of carbene c (18.15 g, 0.084 mol), and benzyl alcohol (3.03 g, 0.028 mol) were evenly mixed and fed into the twin-screw extruder at a constant rate. One thousand nine hundred and forty two grams (1942 g) of polylactic acid was extruded using the above described operating parameters and cooled by air cooling. The polylactic acid thus obtained had a molecular weight of 68,000 and a molecular weight distribution of 1.4.

Example 4

The parameters of the twin-screw extruder were set as follows: screw speed: 50 rpm, vacuum: 0.8 kPa, aspect ratio: 40, material feed rate: 1.75 kg/h.

The temperatures of various barrel sections were set as follows: Section I: 120° C., Section II: 175° C., Section III: 180° C., Section IV: 175° C.

Racemic-lactide (2016 g, 14 mol), the $CO_2$ adduct of carbene d (15.83 g, 0.07 mol), and benzyl alcohol (2.49 g, 0.023 mol) were evenly mixed and fed into the twin-screw extruder. One thousand nine hundred and sixty four grams (1964 g) of polylactic acid was extruded using the above described operating parameters and cooled by air cooling. The polylactic acid thus obtained had a molecular weight of 84,000 and a molecular weight distribution of 1.7.

Example 5

The parameters of the twin-screw extruder were set as follows: screw speed: 80 rpm, vacuum: 0.5 kPa, aspect ratio: 40, material feed rate: 4.5 kg/h.

The temperatures of various barrel sections were set as follows: Section I: 145° C., Section II: 185° C., Section III: 200° C., Section IV: 185° C.

Racemic-lactide (2016 g, 14 mol), the $CO_2$ adduct of carbene e (6.66 g, 0.028 mol), and methanol (0.90 g, 0.028 mol) were evenly mixed and fed into the twin-screw extruder at a constant rate. One thousand nine hundred and seventy five grams (1975 g) of polylactic acid was extruded using the above described operating parameters and cooled by air cooling. The polylactic acid thus obtained had a molecular weight of 59,000 and a molecular weight distribution of 1.5.

Example 6

The parameters of the twin-screw extruder were set as follows: screw speed: 5 rpm, Vacuum: 1 kPa, aspect ratio: 70, material feed rate: 4.5 kg/h The temperatures of various barrel sections were set as follows: Section I: 50° C., Section II: 145° C., Section III: 200° C., Section IV: 185° C.

Meso-lactide (2016 g, 14 mol), the $CO_2$ adduct of carbene f (4.87 g, 0.014 mol), and phenylethyl alcohol (1.71 g, 0.014 mol) were evenly mixed and fed into the twin-screw extruder at a constant rate. One thousand nine hundred and sixty six grams (1966 g) of polylactic acid was extruded using the above described operating parameters and cooled by air cooling. The polylactic acid thus obtained had a molecular weight of 104,000 and a molecular weight distribution of 1.6.

Example 7

The parameters of the twin-screw extruder were set as follows: screw speed: 150 rpm, vacuum: 0.5 kPa, aspect ratio: 30, material feed rate: 4.5 kg/h The temperatures of various barrel sections were set as follows: Section I: 145° C., Section II: 150° C., Section III: 170° C., Section IV: 135° C.

L-lactide (2016 g, 14 mol), the $CO_2$ adduct of carbene g (1293.49 g, 2.8 mol), and methanol (224.21 g, 7 mol) were evenly mixed and fed into the twin-screw extruder at a constant rate. One thousand nine hundred and five grams (1905 g) of polylactic acid was extruded using the above described operating parameters and cooled by air cooling. The polylactic acid thus obtained had a molecular weight of 288 and a molecular weight distribution of 1.5.

Example 8

The parameters of the twin-screw extruder were set as follows: screw speed: 200 rpm, vacuum: 0.5 kPa, aspect ratio: 48, material feed rate: 4.5 kg/h.

The temperatures of various barrel sections were set as follows: Section I: 170° C., Section II: 185° C., Section III: 200° C., Section IV: 140° C.

D-lactide (2016 g, 14 mol), the $CO_2$ adduct of carbene h (119.75 g, 0.35 mol), and methanol (5.61 g, 0.175 mol) were evenly mixed and fed into the twin-screw extruder at a constant rate. One thousand nine hundred and twenty four grams (1924 g) of polylactic acid was extruded using the above described operating parameters and cooled by air cooling.

The polylactic acid thus obtained had a molecular weight of 11,000 and a molecular weight distribution of 1.7.

Example 9

The parameters of the twin-screw extruder were set as follows: screw speed: 80 rpm, vacuum: 1 kPa, aspect ratio: 48, material feed rate: 4.5 kg/h The temperatures of various barrel sections were set as follows: Section I: 90° C., Section II: 120° C., Section III: 150° C., Section IV: 140° C.

D-lactide (2016 g, 14 mol), the $CO_2$ adduct of carbene i (1.62 g, 0.007 mol), and phenylethyl alcohol (0.17 g, 0.0014 mol) were evenly mixed and fed into the twin-screw extruder at a constant rate, while the head of extruder is connected to a molding equipment. The lactic acid was extruded and molded into a film using the above described operating parameters and cooled by air cooling.

Example 10

The parameters of the twin-screw extruder were set as follows: screw speed: 5 rpm, vacuum: 1 kPa, aspect ratio: 40, material feed rate: 4.5 kg/h The temperatures of various barrel sections were set as follows: Section I: 145° C., Section II: 185° C., Section III: 300° C., Section IV: 185° C.

L-lactide (2016 g, 14 mol), the $CO_2$ adduct of carbene j (7.22 g, 0.023 mol), and methanol (0.05 g, 0.0014 mol) were evenly mixed and fed into the twin-screw extruder at a constant rate. One thousand nine hundred and fifty three grams (1953 g) of polylactic acid was extruded using the above described operating parameters and cooled by air cooling. The polylactic acid thus obtained had a molecular weight of 85,000 and a molecular weight distribution of 2.2.

Example 11

The parameters of the twin-screw extruder were set as follows: screw speed: 100 rpm, vacuum: 0.5 kPa, aspect ratio: 48, material feed rate: 5 kg/h.

The temperatures of various barrel sections were set as follows: Section I: 165° C., Section II: 200° C., Section III: 300° C., Section IV: 185° C.

L-lactide (2016 g, 14 mol), the $CO_2$ adduct of carbene k (5.63 g, 0.028 mol), and benzyl alcohol (3.03 g, 0.028 mol) were evenly mixed and fed into the twin-screw extruder at a constant rate. One thousand nine hundred and six grams (1906 g) of polylactic acid was extruded using the above described operating parameters and cooled by air cooling. The polylactic acid thus obtained had a molecular weight of 78,000 and a molecular weight distribution of 1.7.

Example 12

The parameters of the twin-screw extruder were set as follows: screw speed: 150 rpm, vacuum: 1 kPa, aspect ratio: 48, material feed rate: 1.0 kg/h The temperatures of various barrel sections were set as follows: Section I: 145° C., Section II: 185° C., Section III: 200° C., Section IV: 165° C.° C.

L-lactide (2016 g, 14 mol), the $CO_2$ adduct of carbene I (7.87 g, 0.028 mol) and benzyl alcohol (6.05 g, 0.056 mol) were evenly mixed and fed into the twin-screw extruder at a constant rate. One thousand nine hundred and eighty three grams (1983 g) of polylactic acid was extruded using the above described operating parameters and cooled by air cooling. The polylactic acid thus obtained had a molecular weight of 31,000 and a molecular weight distribution of 1.4.

Example 13

The parameters of the twin-screw extruder were set as follows: screw speed: 125 rpm, vacuum: 0.8 kPa, aspect ratio: 48, material feed rate: 1.5 kg/h The temperatures of various barrel sections were set as follows: Section I: 165° C.° C., Section II: 200° C., Section III: 250° C., Section IV: 185° C.

L-lactide (2016 g, 14 mol), the $CO_2$ adduct of carbene m (4.44 g, 0.023 mol) and benzyl alcohol (3.78 g, 0.035 mol) were evenly mixed and fed into the twin-screw extruder at a constant rate. One thousand nine hundred and forty three grams (1943 g) of polylactic acid was extruded using the above described operating parameters and cooled by air cooling. The polylactic acid thus obtained had a molecular weight of 53,000 and a molecular weight distribution of 1.7.

Example 14

The parameters of the twin-screw extruder were set as follows: screw speed: 150 rpm, vacuum: 1 kPa, aspect ratio: 40, material feed rate: 1.5 kg/h The temperatures of various barrel sections were set as follows: Section I: 180° C., Section I: 225° C., Section III: 300° C., Section IV: 185° C.

L-lactide (2016 g, 14 mol), the $CO_2$ adduct of carbene n (5.04 g, 0.023 mol), and methanol (0.74 g, 0.023 mol) were evenly mixed and fed into the twin-screw extruder at a constant rate. One thousand nine hundred and twenty one grams (1921 g) of polylactic acid was extruded using the above described operating parameters and cooled by air cooling. The polylactic acid thus obtained had a molecular weight of 92,000 and a molecular weight distribution of 1.8.

Example 15

The parameters of the twin-screw extruder were set as follows: speed: 150 rpm, vacuum: 0.7 kPa, aspect ratio: 48, material feed rate: 2.5 kg/h The temperatures of various barrel sections were set as follows: Section I: 200° C., Section II: 250° C., Section III: 300° C., Section IV: 165° C.

L-lactide (2016 g, 14 mol), the $CO_2$ adduct of carbene o (26.18 g, 0.07 mol), and benzyl alcohol (7.56 g, 0.07 mol) were evenly mixed and fed into the twin-screw extruder at a constant rate. One thousand nine hundred and forty five grams (1945 g) of polylactic acid was extruded using the above described operating parameters and cooled by air cooling. The polylactic acid thus obtained had a molecular weight of 24,000 and a molecular weight distribution of 1.4.

Example 16

The parameters of the twin-screw extruder were set as follows: speed: 150 rpm, vacuum: 1 kPa, aspect ratio: 48, material feed rate: 1.5 kg/h The temperatures of various barrel sections were set as follows: Section I: 165° C., Section II: 185° C., Section III: 250° C., Section IV: 185° C.

L-lactide (2016 g, 14 mol), the $CO_2$ adduct of carbene p (6.56 g, 0.023 mol), and benzyl alcohol (3.78 g, 0.035 mol) were evenly mixed and fed into the twin-screw extruder at a constant rate. One thousand nine hundred and ninety four grams (1994 g) of polylactic acid was extruded using the above described operating parameters and cooled by air cooling. The polylactic acid thus obtained had a molecular weight of 58,000 and a molecular weight distribution of 1.5.

Example 17

The parameters of the twin-screw extruder were set as follows: Screw speed: 125 rpm, vacuum: 1 kPa, aspect ratio: 40, material feed rate: 1.5 kg/h The temperatures of various barrel sections were set as follows: Section I: 185° C., Section II: 225° C., Section III: 300° C., Section IV: 165° C.

L-lactide (2016 g, 14 mol), the $CO_2$ adduct of carbene q (4.37 g, 0.018 mol), and phenylethyl alcohol (2.20 g, 0.018 mol) were evenly mixed and fed into the twin-screw extruder at a constant rate. One thousand nine hundred and three grams (1903 g) of polylactic acid was extruded using the above described operating parameters and cooled by air cooling. The polylactic acid thus obtained had a molecular weight of 109,000 and a molecular weight distribution of 2.0.

Example 18

The parameters of the twin-screw extruder were set as follows: screw speed: 150 rpm, vacuum: 0.8 kPa, aspect ratio: 48, material feed ratio: 1.0 kg/h The temperatures of various barrel sections were set as follows: Section I: 200° C., Section II: 225° C., Section III: 280° C., Section IV: 165° C.

L-lactide (2016 g, 14 mol), the $CO_2$ adduct of carbene r (8.14 g, 0.023 mol), and benzyl alcohol (3.78 g, 0.035 mol) were evenly mixed and fed into the twin-screw extruder at a constant rate. One thousand nine hundred and sixty three grams (1963 g) of polylactic acid was extruded using the above described operating parameters and cooled by air cooling. The polylactic acid thus obtained had a molecular weight of 56,000 and a molecular weight distribution of 1.8.

Example 19

The parameters of the twin-screw extruder were set as follows: screw speed: 125 rpm, vacuum: 0.5 kPa, aspect ratio: 48, material feed rate: 1.5 kg/h The temperatures of various barrel sections were set as follows: Section I: 145° C., Section II: 165° C., Section III: 250° C., Section IV: 185° C.

L-lactide (2016 g, 14 mol), the $CO_2$ adduct of carbene s (5.36 g, 0.035 mol), and benzyl alcohol (7.56 g, 0.07 mol) were evenly mixed and fed into the twin-screw extruder at a constant rate. One thousand nine hundred and thirty five grams (1935 g) of polylactic acid was extruded using the above described operating parameters and cooled by air cooling. The polylactic acid thus obtained had a molecular weight of 35,000 and a molecular weight distribution of 1.4.

What is claimed is:

1. A method for preparing polylactic acid, comprising:
   obtaining a raw material comprising a carbon dioxide adduct of N-heterocyclic carbene of formula (I) in a solid form and a lactide in a solid form;
   feeding the raw material into an extruder, wherein the lactide is melted so that the raw material becomes a molten mixture;
   raising a temperature of the mixture to a decarboxylation temperature of the N-heterocyclic carbene; and
   obtaining polylactic acid through reactive extrusion of the mixture,

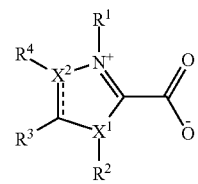

wherein, in formula (I), the dotted line together with the solid line parallel to the dotted line represents a single bond or a double bond;
$X^1$ is chosen from S and N;
$X^2$ is chosen from C and N; and
$R^1$, $R^2$, $R^3$, and $R^4$ satisfy at least one of the following conditions:
(I) $R^1$ and $R^2$ are independently chosen from
hydrogen,
alkyl groups having 1 to 10 carbon atoms,
alkyl groups having 1 to 10 carbon atoms and one or more substituents chosen from halogens, a hydroxyl group, a phenyl group, and a cyano group,
cycloalkyl groups having 3 to 6 carbon atoms,
a halogen atom,
an adamantane group,
a phenyl group, and
a phenyl group having one or more substituents chosen from halogens, a hydroxyl group, an alkyl group, and a cyano group;
(II) $R^3$ and $R^4$ are independently chosen from
hydrogen,
a halogen atom,
a cyano group,
a hydroxyl group,
alkyl groups having 1 to 4 carbon atoms,
alkyl groups having 1 to 4 carbon atoms and one or more substituents chosen from halogens, a hydroxyl group, a phenyl group, and a cyano group,
a phenyl group, and
a phenyl group having one or more substituents chosen from halogens, a hydroxyl group, an alkyl group, and a cyano group;
(III) $R^3$ and $R^4$ are connected to form cycloalkyl or cycloalkenyl rings having 3 to 8 carbon atoms fused to the five-membered ring that contains $X_1$, $X_2$, and nitrogen (in which case $X_2$ and the carbon atom in the 5-membered ring next to $X_2$ are also part of said cycloalkyl or cycloalkenyl rings);
(IV) $R^3$ and $R^4$ are connected to form a benzene ring fused to the five-membered ring that contains $X_1$, $X_2$, and the nitrogen atom (in which case $X_2$ and the carbon atom in the 5-membered ring next to $X_2$ are also part of said benzene ring); and
(V) $R^2$ and $R^3$ are connected to form 5-membered or 6-membered N-heterocyclic rings having no substituent, which are fused to the five-membered ring that contains $X_1$, $X_2$, and the nitrogen atom (in which case $X_1$ and the carbon atom in the 5-membered ring connected to $R^3$ are also part of said 5-membered or 6-membered N-heterocyclic rings).

2. The method of claim 1, wherein the structure of the carbon dioxide adduct of carbene is represented by formula (II):

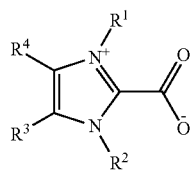

(II)

wherein $R^1$, $R^2$, $R^3$, and $R^4$ satisfy at least one of the following conditions:
(I) $R^1$ and $R^2$ are independently chosen from
hydrogen,
alkyl groups having 1 to 10 carbon atoms,
alkyl groups having 1 to 10 carbon atoms and one or more substituents chosen from halogens, a hydroxyl group, a phenyl group, and a cyano group,
cycloalkyl groups having 3 to 6 carbon atoms,
a halogen atom,
an adamantane group,
a phenyl group, and
a phenyl group having one or more substituents chosen from halogens, a hydroxyl group, an alkyl group, and a cyano group;
(II) $R^3$ and $R^4$ are independently chosen from
hydrogen,
a halogen atom,
a cyano group,
a hydroxyl group,
alkyl groups having 1 to 4 carbon atoms,
alkyl groups having 1 to 4 carbon atoms and one or more substituents chosen from halogens, a hydroxyl group, a phenyl group, and a cyano group,
a phenyl group, and
a phenyl group having one or more substituents chosen from halogens, a hydroxyl group, an alkyl group, and a cyano group;
(III) $R^3$ and $R^4$ are connected to form cycloalkyl or cycloalkenyl rings having 3 to 8 carbon atoms fused to the five-membered ring that contains $X_1$, $X_2$, and the nitrogen atom (in which case $X_2$ and the carbon atom in the 5-membered ring next to $X_2$ are also part of said cycloalkyl or cycloalkenyl rings); and
(IV) $R^3$ and $R^4$ are connected to form a benzene ring fused to the five-membered ring that contains $X_1$, $X_2$, and the nitrogen atom (in which case $X_2$ and the carbon atom in the 5-membered ring next to $X_2$ are also part of said benzene ring).

3. The method of claim 1, wherein the structure of the carbon dioxide adduct of carbene is represented by formula (III):

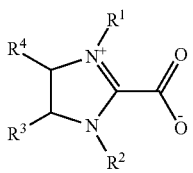

(III)

$R^1$ and $R^2$ are independently chosen from
hydrogen,
alkyl groups having 1 to 10 carbon atoms,
alkyl groups having 1 to 10 carbon atoms and one or more substituents chosen from halogens, a hydroxyl group, a phenyl group, and a cyano group,
cycloalkyl groups having 3 to 6 carbon atoms,
a halogen atom,
an adamantane group,
a phenyl group, and
a phenyl group having one or more substituents chosen from halogens, a hydroxyl group, an alkyl group, and a cyano group;
wherein $R^3$ and $R^4$ satisfy at least one of the following conditions: (I) $R^3$ and $R^4$ are independently chosen from
hydrogen,
a halogen atom,
a cyano group,
a hydroxyl group,
alkyl groups having 1 to 4 carbon atoms,
alkyl groups having 1 to 4 carbon atoms and one or more substituents chosen from halogens, a hydroxyl group, a phenyl group, and a cyano group,
a phenyl group, and
a phenyl group having one or more substituents chosen from halogens, a hydroxyl group, an alkyl group, and a cyano group; and
(II) $R^3$ and $R^4$ are connected to form cycloalkyl or cycloalkenyl rings having 3 to 8 carbon atoms fused to the five-membered ring that contains $X_1$, $X_2$, and the nitrogen atom (in which case $X_2$ and the carbon atom in the 5-membered ring next to $X_2$ are also part of said cycloalkyl or cycloalkenyl rings).

4. The method of claim 1, wherein the structure of the carbon dioxide adduct of carbene is represented by formula (IV):

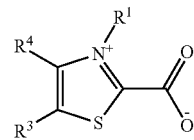

(IV)

wherein $R^1$ is chosen from
hydrogen,
alkyl groups having 1 to 10 carbon atoms,
alkyl groups having 1 to 10 carbon atoms and one or more substituents chosen from halogens, a hydroxyl group, a phenyl group, and a cyano group,
cycloalkyl groups having 3 to 6 carbon atoms,
a halogen atom,
an adamantane group,
a phenyl group, and
a phenyl group having one or more substituents chosen from halogens, a hydroxyl group, an alkyl group, and a cyano group;
wherein $R^3$ and $R^4$ satisfy at least one of the following conditions:
(I) $R^3$ and $R^4$ are independently chosen from
hydrogen,
a halogen atom,
a cyano group,
a hydroxyl group,
alkyl groups having 1 to 4 carbon atoms,
alkyl groups having 1 to 4 carbon atoms and also having one or more substituents chosen from halogens, a hydroxyl group, a phenyl group, and a cyano group, a phenyl group, and a phenyl group having one or more substituents chosen from halogens, a hydroxyl group, an alkyl group, and a cyano group;

(II) $R^3$ and $R^4$ are connected to form cycloalkyl or cycloalkenyl rings having 3 to 8 carbon atoms fused to the five-membered ring that contains $X_1$, $X_2$, and the nitrogen atom (in which case $X_2$ and the carbon atom in the 5-membered ring next to $X_2$ are also part of said cycloalkyl or cycloalkenyl rings); and (III) $R^3$ and $R^4$ are connected to form a benzene ring fused to the five-membered ring that contains $X_1$, $X_2$, and the nitrogen atom (in which case $X_2$ and the carbon atom in the 5-membered ring next to $X_2$ are also part of said benzene ring).

5. The method of claim 1, wherein the structure of the carbon dioxide adduct of carbene is represented by formula (V):

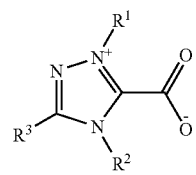

wherein $R^1$, $R^2$, and $R^3$ satisfy at least one of the following conditions:

(I) $R^1$ and $R^2$ are independently chosen from hydrogen, alkyl groups having 1 to 10 carbon atoms, alkyl groups having 1 to 10 carbon atoms and one or more substituents chosen from halogens, a hydroxyl group, a phenyl group, and a cyano group, cycloalkyl groups having 3 to 6 carbon atoms, a halogen atom, an adamantane group, a phenyl group, and a phenyl group having one or more substituents chosen from halogens, a hydroxyl group, an alkyl group, and a cyano group;

(II) $R^3$ is chosen from hydrogen, a halogen atom, a cyano group, a hydroxyl group, alkyl groups having 1 to 4 carbon atoms, alkyl groups having 1 to 4 carbon atoms and one or more substituents chosen from halogens, a hydroxyl group, a phenyl group, and a cyano group, a phenyl group, and a phenyl group having one or more substituents chosen from halogens, a hydroxyl group, an alkyl group, and a cyano group; and (III) $R^2$ and $R^3$ are connected to form 5-membered or 6-membered N-heterocyclic rings having no substituent, which are fused to the five-membered ring that contains $X_1$, $X_2$, and the nitrogen atom (in which case $X_1$ and the carbon atom in the 5-membered ring connected to $R^3$ are also part of said 5-membered or 6-membered N-heterocyclic rings).

6. The method of claim 1, wherein a molar ratio between the carbon dioxide adduct of N-heterocyclic carbene and the lactide ranges from 1:5 to 1:2000.

7. The method of claim 6, wherein the molar ratio between the carbon dioxide adduct of N-heterocyclic carbene and the lactide ranges from 1:100 to 1:1000.

8. The method of claim 1, wherein the lactide is chosen from L-lactide, D-lactide, meso-lactide, racemic lactide, and mixtures thereof.

9. The method of claim 1, wherein the mixture further comprises an initiator and the initiator comprising a compound having a hydroxyl group.

10. The method of claim 9, wherein a molar ratio between the initiator and the lactide ranges from 1:10000 to 1:2.

11. The method of claim 10, wherein the molar ratio between the initiator and the lactide ranges from 1:1000 to 1:100.

12. The method of claim 9, wherein the initiator is benzyl alcohol or phenylethyl alcohol.

13. The method of claim 1, wherein the extruder is a twin-screw extruder.

14. The method of claim 13, wherein the twin-screw extruder is an intermeshing co-rotating twin-screw extruder.

15. The method of claim 14, wherein the twin-screw extruder comprises a barrel having multiple sections and a temperature of each section is independently controllable.

16. The method of claim 15, wherein the temperature of each section of the twin-screw extruder ranges from 100° C. to 300° C.

17. The method of claim 16, wherein the temperature of each section of the twin-screw extruder are the same or different, ranging from 100° C. to 200° C.

18. The method of claim 14, wherein a gas pressure inside the barrel of the twin-screw extruder ranges from 0.5 kPa to 1 kPa absolute pressure.

19. The method of claim 13, wherein a material feed rate for the twin-screw extruder ranges from 0.5 kg/h to 5 kg/h.

20. The method of claim 13, wherein a head of the twin-screw extruder is connected to a molding equipment to mold the polylactic acid and its products into a desired shape.

* * * * *